United States Patent
Fisher et al.

(10) Patent No.: US 9,645,924 B2
(45) Date of Patent: May 9, 2017

(54) GARBAGE COLLECTION SCALING

(71) Applicant: International Business Machines Corporation, Armonk, NY (US)

(72) Inventors: Timothy J. Fisher, Cypress, TX (US); Aaron D. Fry, Richmond, TX (US); Samuel K. Ingram, Fulshear, TX (US); Lincoln T. Simmons, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/106,909

(22) Filed: Dec. 16, 2013

(65) Prior Publication Data
US 2015/0169442 A1    Jun. 18, 2015

(51) Int. Cl.
*G06F 12/02* (2006.01)

(52) U.S. Cl.
CPC ...... *G06F 12/0253* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| 7,526,599 | B2 | 4/2009 | Chang et al. | |
| 8,788,778 | B1* | 7/2014 | Boyle | G06F 12/0253 711/155 |
| 2011/0047347 | A1 | 2/2011 | Li et al. | |
| 2011/0145473 | A1* | 6/2011 | Maheshwari | G06F 12/0866 711/103 |
| 2011/0264843 | A1 | 10/2011 | Haines et al. | |
| 2012/0036313 | A1 | 2/2012 | Ito et al. | |
| 2012/0102297 | A1* | 4/2012 | Haines | G06F 12/0246 711/209 |
| 2012/0151124 | A1 | 6/2012 | Baek et al. | |
| 2012/0173795 | A1* | 7/2012 | Schuette | G06F 12/0246 711/103 |
| 2013/0061019 | A1* | 3/2013 | Fitzpatrick | G06F 11/3485 711/173 |
| 2013/0232290 | A1* | 9/2013 | Ish | G06F 12/0246 711/103 |

OTHER PUBLICATIONS

Write Amplification Wikipedia Archive Documentation. Captured by Wayback Machine on Nov. 6, 2012. Available at <http://web.archive.org/web/20121106054924/http://en.wikipedia.org/wiki/Write_amplification>.*

(Continued)

*Primary Examiner* — Midys Rojas
*Assistant Examiner* — Jane Wei
(74) *Attorney, Agent, or Firm* — David M. Quinn; Steven L. Fisher-Stawinski; Walter L. Rudberg

(57) ABSTRACT

A computer processor determines an over-provisioning ratio and a host write pattern. The computer processor determines a write amplification target based on the host write pattern and the over-provisioning ratio. The computer processor determines a staleness threshold, wherein the staleness threshold corresponds to a ratio of valid pages of a block to total pages of the block. The computer processor erases a first block having a staleness which exceeds the staleness threshold.

17 Claims, 3 Drawing Sheets

(56) References Cited

OTHER PUBLICATIONS

Choudhuri et al., "Deterministic Service Guarantees for NAND Flash using Partial Block Cleaning", pp. 19-24, CODES+ISSS'08, Oct. 19-24, 2008, Atlanta, Georgia, USA, Copyright 2008 ACM 978-1-60558-470-6/08/10.
Han et al., "An Intelligent Garbage Collection Algorithm for Flash Memory Storages", M. Gavrilova et al. (Eds.): ICCSA 2006, LNCS 3980, pp. 1019-1027, 2006, Copyright Springer-Verlag Berlin Heidelberg 2006.
Liu et al., "An Adaptive Block-Set Based Management for Large-Scale Flash Memory", SAC '09, Mar. 8-12, 2009, Honolulu, Hawaii, U.S.A., Copyright 2009 ACM 978-1-60558-166-8/09/03, pp. 1621-1625.
Russell et al., "Artificial Intelligence: A Modern Approach", Prentice Hall, 3rd Edition, section 20.3, pp. 816-824.

\* cited by examiner ized as memory to store data persistently. The primary memory component in an SSD may be NAND flash non-volatile memory or NOR flash non-volatile memory. NAND flash and NOR flash utilize floating-gate transistors. NAND flash and NOR flash are named after the logic gate which their respective assemblies resemble.

GARBAGE COLLECTION SCALING

FIELD OF THE INVENTION

The present invention relates generally to the field of flash memory, and more particularly to garbage collection scaling.

BACKGROUND OF THE INVENTION

A solid-state drive ("SSD") is a data storage device using integrated circuit assemblies as memory to store data persistently. The primary memory component in an SSD may be NAND flash non-volatile memory or NOR flash non-volatile memory. NAND flash and NOR flash utilize floating-gate transistors. NAND flash and NOR flash are named after the logic gate which their respective assemblies resemble.

SSD memories are accessed much like block devices, such as hard disks or memory cards. Each block consists of a number of pages. The pages can be, for example, 512, 2048, or 4096 bytes in size. Data is written to the flash memory in units called pages. A page must be erased before new data may be written to the page. However, to erase a page, the block containing the page is erased. Garbage collection is a process in which a first block is emptied of pages containing valid data, which are re-written to a second block, and the first block is erased to prepare the first block to write new valid data. Garbage collection can contribute to write amplification. Write amplification refers to a condition associated with flash memory and SSDs in which the actual amount of physical information written is a multiple of the logical amount intended to be written.

SUMMARY

Embodiments of the present invention provide a method, system, and computer program product for scaling garbage collection. A computer processor determines an over-provisioning ratio and a host write pattern. The computer processor determines a write amplification target based on the host write pattern and the over-provisioning ratio. The computer processor determines a staleness threshold, wherein the staleness threshold corresponds to a ratio of valid pages of a block to total pages of the block. The computer processor erases a first block having a staleness which exceeds the staleness threshold.

DETAILED DESCRIPTION

Figure 1:
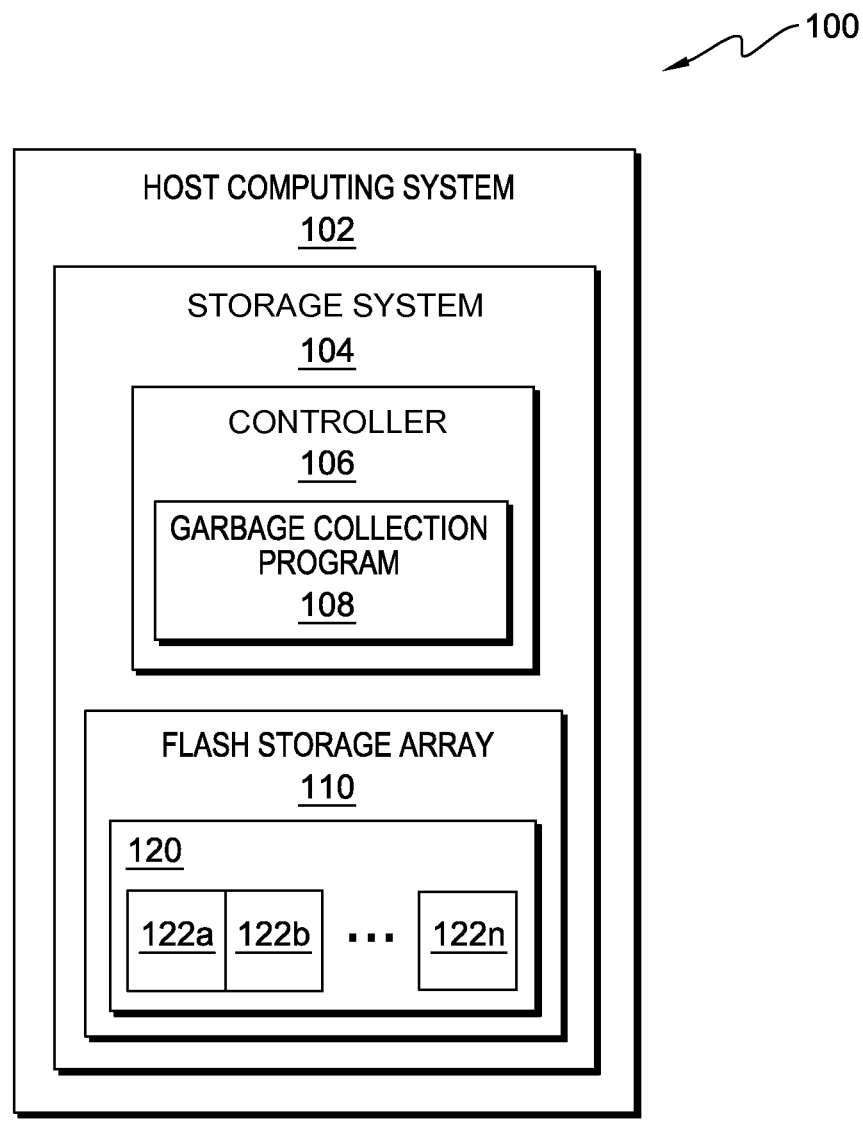
FIG. 1 is a functional block diagram illustrating a storage environment implementing an embodiment of the present invention.

Embodiments of the present invention recognize that delaying garbage collection until empty pages typically are required to accommodate a write operation results in a "write cliff," which is a point of decreased write speeds due to increased write amplification. Embodiments of the present invention provide for proactive garbage collection in order to provide more consistent levels of write amplification. Embodiments of the present invention also provide for determining a staleness threshold, which indicates a ratio of invalid pages to total pages of a block, and performing garbage collection based on the staleness threshold in order to provide more consistent write speeds. Embodiments of the present invention provide for scaling the staleness threshold based upon a host write pattern and a write amplification target.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage media" does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java is a registered trademark of Oracle in the United States, other countries, or both), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 is a functional block diagram illustrating a storage environment, generally designated 100, implementing an embodiment of the present invention.

Storage environment 100 includes host computing system 102. Host computing system 102 may be a laptop computer, a tablet computer, a netbook computer, a personal computer (PC), a desktop computer, a personal digital assistant (PDA), a smart phone, or any programmable electronic device capable of communicating with storage system 104. In other embodiments, host computing system 102 may represent a computing system utilizing multiple computers as a computing system, such as in a cloud computing environment. In another embodiment, host computing system 102 represents a computing system utilizing clustered computers and components to act as a single pool of seamless resources.

Host computing system 102 communicates with storage system 104. In one embodiment, host 102 and storage system 104 may be communicatively coupled via one or more of a range of layers of controllers, busses, or devices. In one embodiment, storage system 104 is a storage system or storage subsystem of host computing system 102. In various embodiments, storage system 104 is a solid state drive ("SSD"), hard disk drive, or a hybrid drive including both solid-state and hard drive components.

Host computing system 102 communicates with storage system 104. In one embodiment, storage system 104 resides within host computing system 102. In another embodiment, storage system 104 is a storage system that is separate from host computing system 102. Host computing system 102 may communicate with storage system 104 using any known communication protocol, a few examples of which include SATA, SCSI, SAS, USB, and FibreChannel. In one embodiment, host computing system 102 and storage system 104 may be communicatively coupled via one or more of a range of layers of controllers, busses, or devices.

Storage system 104 stores data utilizing flash storage array 110. It should be appreciated that the inventions herein can be implemented with a wide range of memory mediums, including for example non-volatile random access memory (NVRAM) technologies such as NAND flash memory, NOR flash memory, phase-change memory (PCM), magnetoresistive RAM (MRAM) and resistive RAM (RRAM).

Flash storage array 110 includes block 120, which includes pages 122a-122n. Flash storage array 110 may include a different number of blocks than depicted in FIG. 1. Each block of flash storage array 110 may include a different number of pages than depicted in FIG. 1. In one embodiment, each page of pages 122a-122n stores a plurality of bytes of data. For example, storage system 104 may include several thousand blocks, each of which may include several thousand pages, each of which may store several thousand bytes of data.

The physical storage capacity of flash storage array 110 is the sum of the capacity of all storage capacity of flash storage array 110. In one embodiment, the physical storage capacity is the sum of the capacity of all pages 122a-122n of flash storage array 110. Storage system 104 may reserve some portion of the physical storage capacity of flash storage array 110 as over-provisioning capacity. The logical storage capacity is the amount of the physical storage capacity to which a logical block address (discussed in more detail below) is mapped. The over-provisioning capacity is difference between the physical storage capacity and the logical storage capacity. Storage system 104 can report the logical storage capacity in response to a query, for example a query from host computing system 102.

Each page of pages 122a-122n stores data. In one embodiment, each page of pages 122a-122n is initialized to a blank state. In response a write command, user data may be written to a blank page, which becomes a valid page and stores the user data. A valid page becomes an invalid page when the user data of the valid page is deleted. A page (valid or invalid) becomes blank when the block in which the page resides is erased. Valid data is data residing in a valid page, such as user data. In one embodiment, a valid page becomes invalid in response to a trim command identifying a logical block address of the page. A trim command is a command which identifies the address of a page which contains data that has been deleted.

Storage system 104 includes controller 106. In one embodiment, controller 106 comprises at least one computer processor or at least one processing node. Controller 106 manages flash memory array 110. In one embodiment, controller 106 can execute read and write commands for flash storage array 110. Controller 106 interfaces with host computing system 102. In one embodiment, controller 106 is in communication with an operating system or other application(s) (not shown) of host computing system 102.

For example, controller 106 may receive read and write commands from host computing system 102. Controller 106 uses a logical-to-physical mapping system known as logical block addressing, which is a system in which controller 106 maps a logical block address (an "LBA") to a physical storage address. The mapping may change over time, such that the same LBA may refer to different physical storage addresses at two different points in time. In one embodiment, controller 106 adjusts the mapping in order to map write commands targeting random logical addresses to non-random (e.g., sequential) physical addresses. When rewriting old data stored at a given LBA with new data, controller 106 writes the new data in a new physical location and updates the LBA mapping to point to the new physical address. Thus, the mapping associates the logical address with the new physical address. The data in the old physical location is no longer valid, and the page containing the invalid data must be erased before the location can be written again, which is accomplished when the block containing the page is erased.

Controller 106 includes garbage collection program ("GC program") 108. In the depicted embodiment, GC program 108 resides in controller 106. In other embodiments, GC program 108 may reside elsewhere within storage system 104. In yet other embodiments, GC program 108 may reside elsewhere within host computing system 102. In yet other embodiments, GC program 108 may reside in another computing system, provided that GC program 108 is in communication with controller 106 and flash storage array 110.

Controller 106, by GC program 108, operates to monitor a host write pattern by monitoring the LBAs of the write operations received by controller 106. The host write pattern is the distribution of LBAs identified by write operations. The LBAs of the write operations can be random to a measurable degree. In one embodiment, the host write pattern is a measure of randomness of LBAs of write commands. For example, controller 106 may monitor the LBAs of write commands and determine that the LBAs are sequential, in which case controller 106 may determine that the write operations are 0% random. In an alternate example, controller 106 may determine that the LBAs follow no pattern, in which case controller 106 may determine that the write operations are 100% random. In one embodiment, the host write pattern is based on a plurality of write commands, such as a predetermined quantity of the most recent write commands. In another embodiment, the host write pattern is determined continuously, for example as a running calculation of randomness of LBAs. In another embodiment, the host write pattern is determined utilizing a clustering algorithm.

A write cluster is a portion of the logical address space which is subject to a high level of write activity. Different data stored at different logical addresses on a drive may be re-written at different frequencies. For example, a logical address corresponding to an operating system file may be frequently read but infrequently re-written. Conversely, for example, a logical address corresponding to a database may be infrequently read but frequently re-written.

In some embodiments, GC program 108 determines an over-provisioning ratio based on the over-provisioning capacity of flash storage array 110 and the total cluster size. In one embodiment, the total cluster size is a value indicating the sum of the capacities of all recognized write clusters of flash memory array 110. A write cluster is a portion of the logical address space of flash memory array 110 with high write activity. In a simplified example, storage system 104 may have a physical storage capacity of 120 gigabytes comprising 100 gigabytes of logical storage capacity and 20 gigabytes of over-provisioning capacity. However, a cluster recognition algorithm may determine a total cluster size of 15 gigabytes. In one embodiment, the over-provisioning ratio is equal to the physical over-provisioning capacity divided by the sum of the physical over-provisioning capacity and the total cluster size. Thus, in the previous example, the over-provisioning ratio is approximately fifty-seven percent, being twenty divided by the sum of twenty and fifteen.

GC program 108 operates to determine a staleness threshold and perform garbage collection on flash storage array 110 based on the staleness threshold. In one embodiment, GC program 108 determines a write amplification target and an over-provisioning ratio, and then determines a staleness threshold based on the write amplification target and over-provisioning ratio. In one embodiment, GC program 108 stores at least one correlation between over-provisioning ratios and write amplification targets, wherein each correlation is associated with a host write pattern.

The staleness threshold indicates a ratio of invalid pages to total pages of a block, which includes invalid pages and valid pages. The write amplification cost necessary to perform garbage collection on a block is proportionate to the number of valid pages of the block, as each valid page must be re-written to another block before the block undergoing garbage collection can be erased. In one embodiment, the staleness threshold is the highest ratio of invalid pages to total pages (meaning the ratio with the highest number of invalid pages relative to the number of total pages) which, when combined with the expected write amplification of the host write pattern, results in a total write amplification which does not exceed the write amplification target. The total write amplification may equal the write amplification target. Blocks with a staleness which exceeds the staleness threshold have a sufficiently low write amplification cost for garbage collection to avoid raising the total write amplification above the write amplification target. In one embodiment, GC program 108 identifies blocks of flash storage array 110 which exceed the garbage collection threshold and performs garbage collection on the identified blocks. GC program 108 is discussed in more detail in connection with FIGS. 2 through 4.

Figure 2:
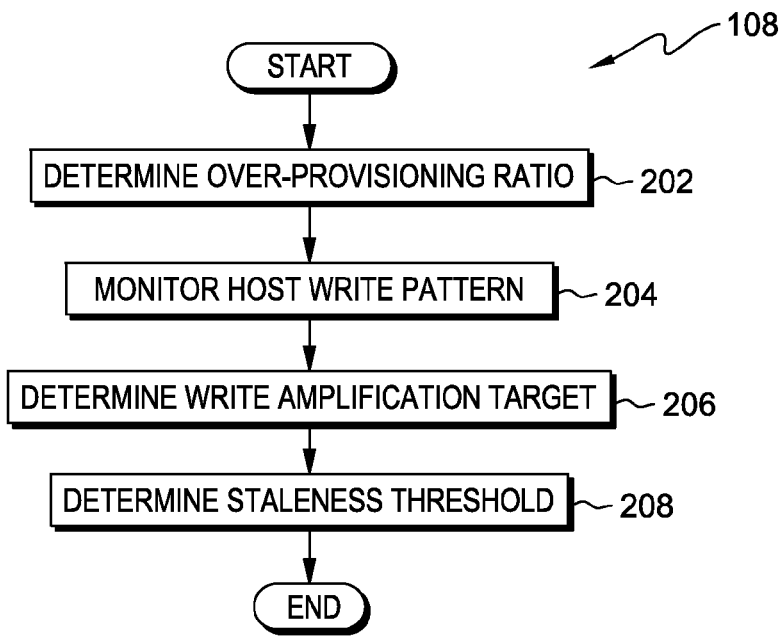
FIG. 2 is a flowchart depicting operations of a garbage collection program for determining a threshold, in accordance with an embodiment of the present invention.

FIG. 2 is a flowchart depicting operational steps of GC program 108 for determining a garbage collection threshold, in accordance with an embodiment of the present invention.

In block 202, GC program 108 determines an over-provisioning ratio. The over-provisioning ratio corresponds to flash storage array 110. In another embodiment, GC program 108 determines the over-provisioning ratio of flash storage array 110 by computing the over-provisioning ratio based on the logical storage capacity of flash storage array 110 and the physical storage capacity of flash storage array 110. For example, GC program 108 may receives values indicating the physical storage capacity and logical storage capacity as input. In another embodiment, GC program 108 queries controller 106 and, in response, receives values indicating the physical storage capacity and logical storage capacity. In one embodiment, GC program 108 determines the physical over-provisioning capacity by determining the difference between the physical storage capacity and the logical storage capacity.

In some embodiments, GC program 108 determines an over-provisioning ratio by receiving the over-provisioning ratio. For example, GC program 108 may receive the over-provisioning ratio as user input, or as a predetermined value from controller 106.

In block 204, GC program 108 monitors a host write pattern. In one embodiment, GC program 108 monitors write commands received by controller 106 in order to determine a host write pattern and to detect changes in the host write pattern. In one embodiment, the host write pattern corresponds to write commands executed by controller 106. In one embodiment, the host write pattern corresponds to flash storage array 110. In some embodiments, GC program 108 monitors the host write pattern by determining a randomness of the distribution of LBAs identified by write operations. In other embodiments, GC program 108 receives the host write pattern as user input. For example, GC program 108 may receive as user input a host write pattern in which write operations are sequential, such as in a video media database that is infrequently written but frequently read. In one embodiment, GC program 108 monitors the host write pattern by continually determining the host write pattern.

In some embodiments, GC program 108 monitors a host write pattern by monitoring the total cluster size of flash memory array 110. In various embodiments, GC program 108 may utilize any of a number of cluster recognition algorithms to recognize write clusters and to determine the total cluster size. Such algorithms may require user input or may be unsupervised, meaning that the algorithm does not require advance information about the nature of the data or the about the characteristics of the clusters. In one embodiment, GC program 108 determines the total cluster size by determining the sum of the size of each cluster.

In some embodiments, GC program 108 determines the over-provisioning ratio of storage system 104 (block 202) utilizing the total cluster size in place of the logical storage capacity. In one embodiment, GC program 108 determines the over-provisioning ratio by determining the over-provisioning capacity divided by the sum of the over-provisioning capacity and the total cluster size.

In block 206, GC program 108 determines a write amplification target. In some embodiments, GC program 108 identifies a correlation associated with the host write pattern. In one such embodiment, the correlation associated with the host write pattern correlates the determined over-provisioning ratio with the write amplification target. In one embodiment, GC program 108 determines the write amplification target by determining a value of a correlation which correlates to the over-provisioning ratio, wherein the correlation is associated with the host write pattern. For example, a correlation associated with a random host write pattern may correlate high over-provisioning ratio values (e.g., greater than 0.8) with low write amplification target values (e.g., less than 1.5) and, conversely, low over-provisioning ratio values (e.g., less than 0.05) with high write amplification target values (e.g., greater than 4). In various embodiments, different host write patterns are associated with different correlations of over-provisioning ratios to write amplification target values.

In block 208, GC program 108 determines a staleness threshold. In one embodiment, GC program 108 determines the staleness threshold based upon the host write pattern and the write amplification target. In some embodiments, GC program 108 stores the staleness threshold for reference.

Figure 3:
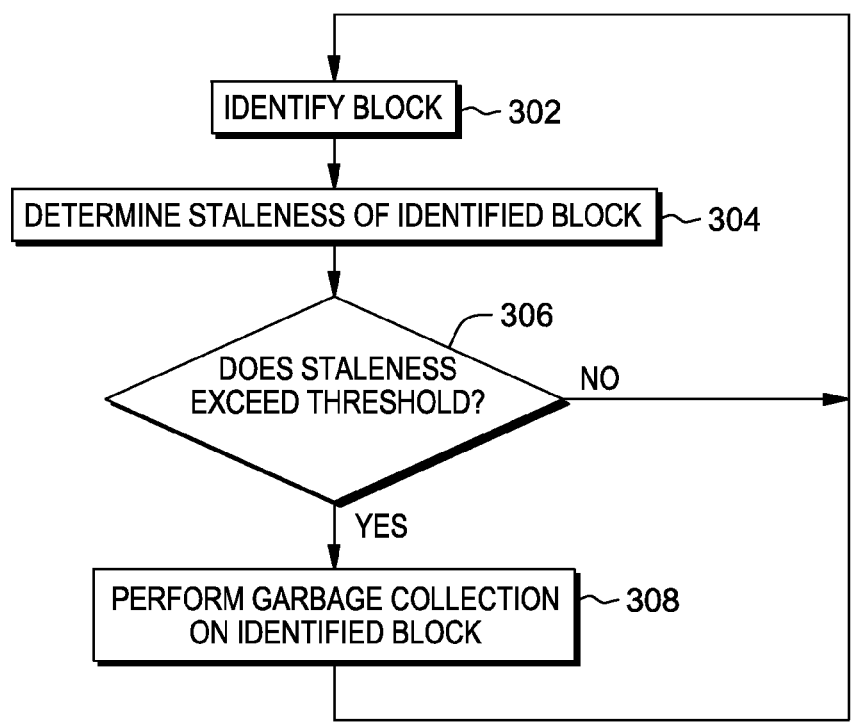
FIG. 3 is a flowchart depicting operations of a garbage collection program for performing garbage collection in response to a threshold, in accordance with an embodiment of the present invention.

FIG. 3 depicts operations of GC program 108 for performing garbage collection in response to a threshold, in accordance with an embodiment of the present invention.

In block 302, GC program 108 identifies a block of flash storage array 110. In one embodiment, GC program 108 identifies each block of flash storage array 110 in turn through multiple iterations of the operations depicted in blocks 302 through 308. In another embodiment, the identified block is a random block of flash storage array 110.

In block 304, GC program 108 determines the staleness of the identified block. In one embodiment, GC program 108 determines the staleness of the identified block based on a valid page quantity and an invalid page quantity, each corresponding to the identified block. For example, GC program 108 may determine the staleness of the identified block as a percentage by computing the invalid page quantity divided by the total page quantity (i.e., the sum of the valid page quantity and invalid page quantity). In one embodiment, GC program 108 retrieves the valid and invalid page quantities. In another embodiment, GC program 108 receives the valid and invalid page quantities. For example, GC program 108 may receive a valid page quantity and an invalid page quantity from controller 106.

In decision 306, GC program 108 determines whether the staleness of the identified block exceeds the staleness threshold. For example, GC program 108 compares the staleness of the identified block to the staleness threshold to determine whether the staleness of the identified block exceeds the staleness threshold. If GC program 108 determines that the staleness of the identified block exceeds the staleness threshold (decision 306, YES branch), then GC program 108 performs garbage collection on the identified block (308). If GC program 108 determines that the staleness of the identified block does not exceed the staleness threshold (decision 306, NO branch), then GC program 108 returns to block 302. In some embodiments, the staleness threshold may be decremented so that a staleness of an identified block which would otherwise equal the staleness threshold instead exceeds the staleness threshold. Alternatively, GC program 108 may determine whether the staleness of the identified block equals or exceeds the staleness threshold.

In some embodiments, GC program 108 may delay garbage collection for the identified block based, at least in part, on the rate of change of staleness of the identified block. In other embodiments, GC program 108 may delay garbage collection for the identified block based, at least in part, on the amount of time since GC program 108 determined that the staleness of the identified block exceeded the staleness threshold. For example, if GC program 108 determines that the staleness of the identified block exceeds the staleness threshold (decision 306, YES branch), then GC program 108 may determine whether the time since the last write operation to the identified block exceeds a time threshold or, alternatively, whether the staleness of the identified block has changed more than a predetermined amount within a predetermined amount of time.

In some embodiments, GC program 108 operates regardless of disk activity. In other embodiments, GC program 108 suspends some or all operation dependent on disk activity. For example, GC program 108 may suspend garbage collection operations during periods of high disk activity. Alternatively, GC program 108 may scale garbage collection operations inversely with the intensity of disk activity.

Figure 4:
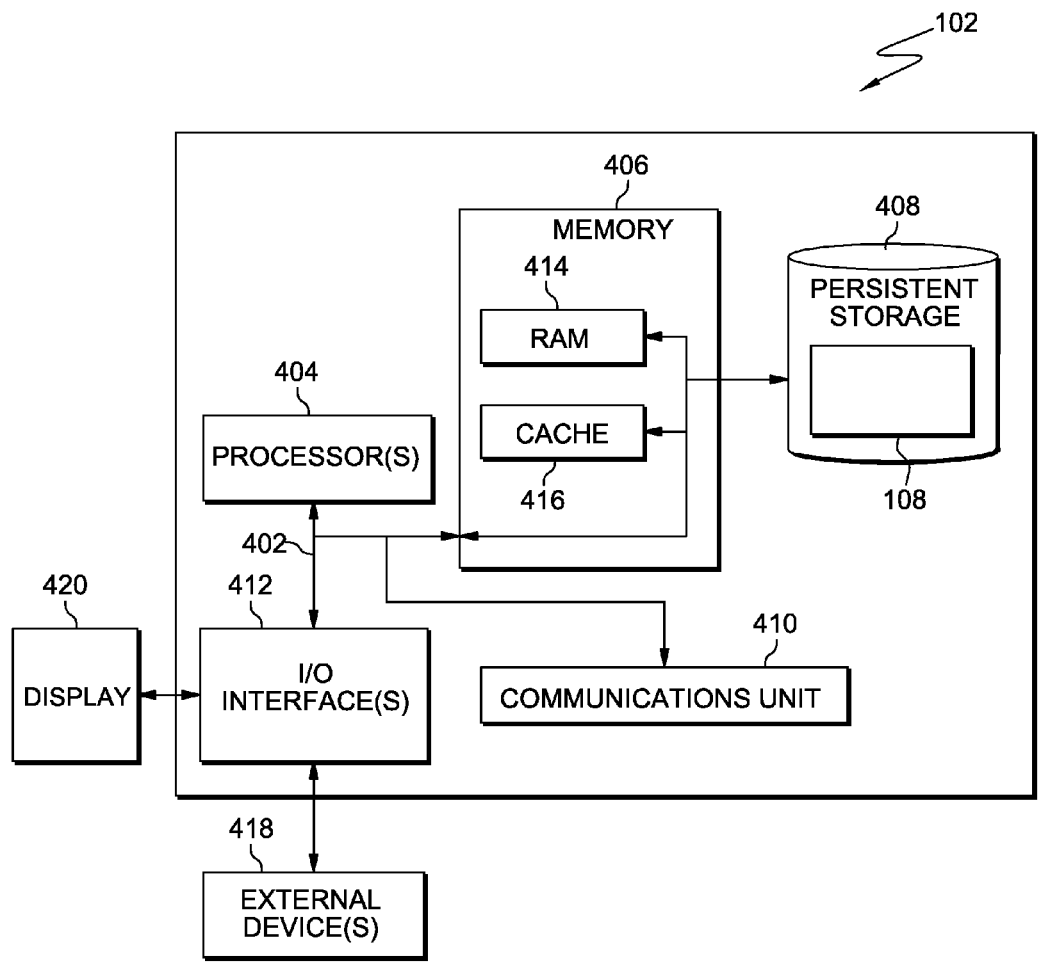
FIG. 4 depicts a block diagram of components of the host computing system executing the garbage collection program, in accordance with an embodiment of the present invention.

FIG. 4 depicts a block diagram of components of host computing system 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Host computing system 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

GC program 108 is stored in persistent storage 408 for execution by one or more of the respective computer processor(s) 404 via one or more memories of memory 406. In this embodiment, persistent storage 408 includes a solid state disk drive. Alternatively, or in addition to a solid state disk drive, persistent storage 408 can include a magnetic hard disk drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. GC program 108 may be downloaded to persistent storage 408 through communications unit 410.

I/O interface(s) 412 allows for input and output of data with other devices that may be connected to host computing system 102. For example, I/O interface(s) 412 may provide a connection to external devices 418 such as a keyboard, a keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., GC program 108, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for scaling garbage collection, the method comprising:
    determining, by a first computer processor, an over-provisioning ratio of a storage device, wherein the storage device includes a plurality of blocks;
    monitoring a write pattern of the storage device, wherein monitoring the host write pattern comprises determining a randomness of a plurality of write commands, each write command identifying a logical block address;
    determining a write amplification target based on the write pattern and the over-provisioning ratio, wherein a low write amplification target is associated with a high over-provisioning ratio value and a high write amplification target is associated with a low over-provisioning ratio value;
    determining a staleness threshold based on the write amplification target, wherein the staleness threshold corresponds to a quantity of valid pages of the block and wherein the staleness threshold indicates a ratio of invalid pages to total pages of the block, wherein the total pages of the block comprises a set of valid pages and a set of invalid pages; and
    proactively performing garbage collection on one or more blocks, with a write amplification cost low enough such that a total write amplification does not exceed the write amplification target, wherein proactively performing garbage collection on the one or more blocks comprises erasing content in each of the one or more blocks having a staleness exceeding the staleness threshold, and wherein proactively performing garbage collection on the one or more blocks is based on a delay on at least one of a rate of change in staleness for the block and an amount of time since determining that that the staleness of the block exceeded the staleness threshold.

2. The method of claim 1, wherein determining the over-provisioning ratio comprises:
    determining a physical storage capacity;
    determining a logical storage capacity based on a logical addressing space;
    determining the over-provisioning ratio based on the physical storage capacity and the logical storage capacity; and
    determining an over provision capacity of the over-provisioning ratio, wherein the over provision capacity is based on dividing by a sum of the over provisioning capacity and a total cluster size.

3. The method of claim 1, wherein monitoring the host write pattern comprises:
   determining an over-provisioning capacity;
   determining at least one write cluster of a logical address space, each write cluster of the at least one write cluster having a size;
   determining a total cluster size based on the size of the at least one write cluster; and
   determining the over-provisioning ratio based on the physical storage capacity and the total cluster size.

4. The method of claim 1, further comprising:
   identifying the first block, wherein the first block is a block of a plurality of blocks, wherein each block of the plurality of blocks comprises a plurality of pages;
   determining the staleness of the first block based on a quantity of pages of the block which comprise valid data; and
   determining whether the staleness of the first block exceeds the staleness threshold.

5. The method of claim 4, further comprising:
   in response to determining that the staleness of the first block does not exceed the staleness threshold, identifying a second block.

6. The method of claim 4, further comprising:
   in response to determining that the staleness of the first block does exceed the staleness threshold, writing valid data of the first block to a second block and erasing the first block.

7. The method of claim 1, further comprising:
   receiving a correlation, which is associated with the host write pattern, wherein the correlation associates the over-provisioning ratio and the write amplification target.

8. A computer program product for scaling garbage collection, the computer program product comprising:
   one or more computer-readable storage media and program instructions stored on the one or more computer-readable storage media, the program instructions comprising program instructions to:
   determine an over-provisioning ratio of a non-volatile memory;
   monitor a host write pattern, wherein monitoring the host write pattern comprises determining a randomness of a plurality of write commands, each write command identifying a logical block address;
   determine a write amplification target based on the host write pattern and the over-provisioning ratio, wherein a low write amplification target is associated with a high over-provisioning ratio value and a high write amplification target is associated with a low over-provisioning ratio value;
   determine a staleness threshold, wherein the staleness threshold corresponds to a quantity of valid pages of the block wherein the staleness threshold indicates a ratio of invalid pages to total pages of the block, wherein the total pages of the block comprises a set of valid pages and a set of invalid pages; and
   proactively perform garbage collection on one or more blocks, with a write amplification cost low enough to avoid raising the total write amplification above the write amplification target wherein proactively performing garbage collection on the one or more blocks comprises erasing a first block having a staleness which exceeds the staleness threshold, and wherein proactively performing garbage collection on the one or more blocks is based on a delay on at least one of a rate of change in staleness for the block and an amount of time since determining that the staleness of the block exceeded the staleness threshold.

9. The computer program product of claim 8, wherein the program instructions to determine the over-provisioning ratio comprise program instructions to:
   determine a physical storage capacity;
   determine a logical storage capacity based on a logical addressing space;
   determine the over-provisioning ratio based on the physical storage capacity and the logical storage capacity; and
   determine an over provision capacity of the over-provisioning ratio, wherein the over provision capacity is based on dividing by a sum of the over provisioning capacity and a total cluster size.

10. The computer program product of claim 8, wherein the program instructions to monitor the host write pattern comprise program instructions to:
    determine an over-provisioning capacity;
    determine at least one write cluster of a logical address space, each write cluster of the at least one write cluster having a size;
    determine a total cluster size based on the size of the at least one write cluster; and
    determine the over-provisioning ratio based on the physical storage capacity and a total cluster size.

11. The computer program product of claim 8, wherein the program instructions further comprise program instructions to:
    identify the first block, wherein the first block is a block of a plurality of blocks, wherein each block of the plurality of blocks comprises a plurality of pages;
    determine the staleness of the first block based on a quantity of pages of the block which comprise valid data; and
    determine whether the staleness of the first block exceeds the staleness threshold.

12. The computer program product of claim 11, wherein the program instructions further comprise program instructions to:
    in response to determining that the staleness of the first block does not exceed the staleness threshold, identify a second block; and
    in response to determining that the staleness of the first block does exceed the staleness threshold, write valid data of the first block to a second block and erase the first block.

13. A computer system for scaling garbage collection, the computer system comprising:
    one or more computer processors;
    one or more computer-readable storage media;
    program instructions stored on the computer-readable storage media for execution by at least one of the one or more processors, the program instructions comprising program instructions to:
    determine an over-provisioning ratio of a non-volatile memory;
    monitor a host write pattern, wherein monitoring the host write pattern comprises determining a randomness of a plurality of write commands, each write command identifying a logical block address;
    determine a write amplification target based on the host write pattern and the over-provisioning ratio, wherein a low write amplification target is associated with a high over-provisioning ratio value and a high write amplification target is associated with a low over-provisioning ratio value;

determine a staleness threshold, wherein the staleness threshold corresponds to a quantity of valid pages of the block wherein the staleness threshold indicates a ratio of invalid pages to total pages of the block, wherein the total pages of the block comprises a set of valid pages and a set of invalid pages; and proactively perform garbage collection on one or more blocks with a write amplification cost low enough to avoid raising the total write amplification above the write amplification target wherein proactively performing garbage collection on the one or more blocks comprises erasing a first block having a staleness which exceeds the staleness threshold, and wherein proactively performing garbage collection on the one or more blocks is based on a delay based on at least one of a rate of change in staleness for the block and an amount of time since determining that that the staleness of the block exceeded the staleness threshold.

14. The computer system of claim 13, wherein the program instructions to determine the over-provisioning ratio comprises program instructions to:

determine a physical storage capacity;

determine a logical storage capacity based on a logical addressing space;

determine the over-provisioning ratio based on the physical storage capacity and the logical storage capacity; and determine an over provision capacity of the over-provisioning ratio, wherein the over provision capacity is based on dividing by a sum of the over provisioning capacity and a total cluster size.

15. The computer system of claim 13, wherein the program instructions to monitor the host write pattern comprises program instructions to:

determine an over-provisioning capacity;

determine at least one write cluster of a logical address space, each write cluster of the at least one write cluster having a size;

determine a total cluster size based on the size of the at least one write cluster; and determine the over-provisioning ratio based on the physical storage capacity and a total cluster size.

16. The computer system of claim 13, wherein the program instructions further comprise program instructions to:

identify the first block, wherein the first block is a block of a plurality of blocks, wherein each block of the plurality of blocks comprises a plurality of pages;

determine the staleness of the first block based on a quantity of pages of the block which comprise valid data; and determine whether the staleness of the first block exceeds the staleness threshold.

17. The computer system of claim 16, wherein the program instructions further comprise program instructions to:

in response to determining that the staleness of the first block does not exceed the staleness threshold, identify a second block; and in response to determining that the staleness of the first block does exceed the staleness threshold, write valid data of the first block to a second block and erase the first block.

* * * * *